United States Patent
Tochihara et al.

(10) Patent No.: US 12,227,617 B2
(45) Date of Patent: Feb. 18, 2025

(54) POLYAMIDE RESIN, COMPOSITION, AND MOLDED ARTICLE

(71) Applicant: Mitsubishi Gas Chemical Company, Inc., Tokyo (JP)

(72) Inventors: Tatsuya Tochihara, Niigata (JP); Nobuhiko Matsumoto, Hiratsuka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 789 days.

(21) Appl. No.: 17/424,768

(22) PCT Filed: Nov. 26, 2019

(86) PCT No.: PCT/JP2019/046049
§ 371 (c)(1),
(2) Date: Jul. 21, 2021

(87) PCT Pub. No.: WO2020/152974
PCT Pub. Date: Jul. 30, 2020

(65) Prior Publication Data
US 2022/0064377 A1    Mar. 3, 2022

(30) Foreign Application Priority Data

Jan. 22, 2019 (JP) ................................. 2019-008315

(51) Int. Cl.
*C08G 69/32*    (2006.01)
(52) U.S. Cl.
CPC .................... *C08G 69/32* (2013.01)
(58) Field of Classification Search
CPC ................................ C08G 69/32; C08G 69/265
See application file for complete search history.

(56) References Cited

U.S. PATENT DOCUMENTS

| 2,130,947 | A | * | 9/1938 | Carothers | ............. | C08G 69/04 |
| | | | | | | 528/335 |
| 4,925,914 | A | | 5/1990 | Dolden et al. | | |
| 2012/0302723 | A1 | * | 11/2012 | Oda | ......... | C08L 77/06 |
| | | | | | | 528/324 |

FOREIGN PATENT DOCUMENTS

| CN | 103626995 | * | 2/2014 | | |
| CN | 103626995 | A | 3/2014 | | |
| CN | 106279905 | * | 1/2017 | | |
| CN | 106279905 | A | 1/2017 | | |
| CN | 109575441 | A | 4/2019 | | |
| GB | 1410005 | A | * | 10/1975 | ........... C08G 69/265 |
| JP | H01-95130 | A | 4/1989 | | |
| JP | 2017-110101 | A | 6/2017 | | |
| JP | 7188118 | B2 | 12/2022 | | |

OTHER PUBLICATIONS

Extended European Search Report issued in corresponding European Application No. 19911088.3 on Mar. 31, 2022 (8 pages).
JPO; Application No. 2020-567389; Office Action dated May 16, 2023, 4 pages.
International Preliminary Report on Patentability and Written Opinion for PCT/JP2019/046049, mailed Feb. 10, 2020, and English Translation submitted herewith (14 pages).
International Search Report for PCT/JP2019/046049, mailed Feb. 10, 2020, and English Translation submitted herewith (5 pages).

* cited by examiner

*Primary Examiner* — Kumar R Bhushan
(74) *Attorney, Agent, or Firm* — Fitch, Even, Tabin & Flannery LLP

(57) ABSTRACT

Provided are a novel polyamide resin having a high melting point, and a composition and a molded article, for which the novel polyamide resin is used. A polyamide resin including a constituent unit derived from a diamine and a constituent unit derived from a dicarboxylic acid, where 70 mol % or more of the constituent unit derived from the diamine is derived from a xylylenediamine; and 70 mol % or more of the constituent unit derived from the dicarboxylic acid is derived from a phenylenediacetic acid; and where X+(Y/3) is 68 or more, when X mol % is defined as a proportion of a constituent unit derived from 1,4-phenylenediacetic acid in the constituent unit derived from the dicarboxylic acid, and Y mol % is defined as a proportion of a constituent unit derived from p-xylylenediamine in the constituent unit derived from the diamine.

16 Claims, No Drawings

POLYAMIDE RESIN, COMPOSITION, AND MOLDED ARTICLE

CROSS-REFERENCE TO RELATED APPLICATIONS

This application is a U.S. national phase application filed under 35 U.S.C. § 371 of International Application Number PCT/JP2019/046049, filed Nov. 26, 2019, designating the United States, which claims priority from Japanese Application Number 2019-008315, filed Jan. 22, 2019.

FIELD OF THE INVENTION

The present invention relates to a novel polyamide resin, a composition and a molded article.

BACKGROUND OF THE INVENTION

Polyamide resins have been used in various applications, including electric/electronic components and packaging containers for food.

Various kinds of polyamide resins are known; examples include polyamide 66, which is obtained through polycondensation of adipic acid and hexamethylene diamine, and MXD6, which is obtained through polycondensation of adipic acid and m-xylylenediamine.

Polyamide resins having higher melting points are in demand, as their applications diversify and technological innovation advances.

For example, Patent Document 1 discloses a polyamide resin including a constituent unit derived from a diamine and a constitutional unit derived from a dicarboxylic acid, where 70 mol % or greater of the constituent unit derived from the diamine is derived from a xylylenediamine, and 70 mol % or greater of the constituent unit derived from the dicarboxylic acid is derived from a, co-straight-chain aliphatic dicarboxylic acid having from 4 to 8 carbons, and the polyamide resin has a melting point from 270 to 285° C., an isomeric mole ratio of the xylylenediamine constituting the constituent unit derived from the diamine is from 60/40 to 43/57 (m-xylylenediamine/p-xylylenediamine), and a degree of crystallinity calculated by X-ray diffractometry is from 30 to 70%.

CITATION LIST

Patent Literature

Patent Document 1: JP 2017-110101 A

SUMMARY OF INVENTION

The melting point of polyamide 66 is approximately 268° C., and the melting point of MXD6 is approximately 237° C. Although these resins have adequately high melting points, a resin having even higher melting points is desired, considering the technological innovation in recent years.

Meanwhile, although the polyamide resins described in Patent Document 1 have high melting points, a novel polyamide resin is demanded, as applications of polyamide resins diversify.

An object of the present invention is to solve the problems described above, and it is to provide a novel polyamide resin having a high melting point, and a composition and a molded article that use the novel polyamide resin.

For the purpose described above, as a result of research conducted by the present inventors found that the problems described above would be solved by using a phenylenediacetic acid and a xylylenediamine as raw material monomers of a polyamide resin and setting a ratio of 1,4-phenylenediacetic acid to p-xylylenediamine to be greater or equal to a predetermined value. Specifically, the problems described above are solved by the following <1>, and preferably by the following <2> to <11>.

<1> A polyamide resin including a constituent unit derived from a diamine and a constituent unit derived from a dicarboxylic acid, where 70 mol % or more of the constituent unit derived from the diamine is derived from a xylylenediamine, and 70 mol % or more of the constituent unit derived from the dicarboxylic acid is derived from a phenylenediacetic acid; and where $X+(Y/3)$ is 68, when X mol % is defined as a constituent unit derived from 1,4-phenylenediacetic acid in the constituent unit derived from the dicarboxylic acid, and taken as Y mol % is defined as a proportion of a constituent unit derived from p-xylylenediamine in the constituent unit derived from the diamine.

<2> The polyamide resin according to <1>, where 90 mol % or more of the constituent unit derived from the diamine is derived from a xylylenediamine, and 90 mol % or more of the constituent unit derived from the dicarboxylic acid is derived from a phenylenediacetic acid.

<3> The polyamide resin according to <1> or <2>, where the xylylenediamine is m-xylylenediamine and/or p-xylylenediamine.

<4> The polyamide resin according to any one of <1> to <3>, where the phenylenediacetic acid is 1,4-phenylenediacetic acid or a mixture of 1,4-phenylenediacetic acid and 1,3-phenylenediacetic acid.

<5> The polyamide resin according to any one of <1> to <4>, where $X+(Y/3)$ is 70 or more.

<6> A polyamide resin including a constituent unit derived from a diamine and a constituent unit derived from a dicarboxylic acid, where more than 50 mol % of the constituent unit derived from the dicarboxylic acid is derived from 1,4-phenylenediacetic acid.

<7> A polyamide resin including a constituent unit derived from a diamine and a constituent unit derived from a dicarboxylic acid, where 90 mol % or more of the constituent unit derived from the diamine is derived from a xylylenediamine, and 90 mol % or more of the constituent unit derived from the dicarboxylic acid is derived from a phenylenediacetic acid; and where $X+(Y/3)$ is from 68 to 133, when X mol % is defined as a proportion of a constituent unit derived from 1,4-phenylenediacetic acid in the constituent unit derived from the dicarboxylic acid, and Y mol % is defined as a proportion of a constituent unit derived from p-xylylenediamine in the constituent unit derived from the diamine.

<8> The polyamide resin according to any one of <1> to <7>, where a melting point of the polyamide resin is 280° C. or higher.

<9> The polyamide resin according to any one of <1> to <8>, where a glass transition temperature of the polyamide resin is 100° C. or higher.

<10> The polyamide resin according to any one of <1> to <9>, where the xylylenediamine includes from 60 to 100 mol % of m-xylylenediamine and from 40 to 0 mol % of p-xylylenediamine.

<11> A composition including the polyamide resin according to any one of <1> to <10>.

<12> A molded article including the composition according to <11>.

According to the present invention, provided are a novel polyamide resin having a high melting point, and a composition and a molded article that use the novel polyamide resin.

DESCRIPTION OF EMBODIMENTS

The contents of the present invention will be described in detail below. Note that, in the present specification, "from . . . to . . . " is used to mean that the given numerical values are included as the lower limit value and the upper limit value, respectively.

The polyamide resin according to the present invention includes a constituent unit derived from a diamine and a constituent unit derived from a dicarboxylic acid, where 70 mol % or more of the constituent unit derived from the diamine is derived from a xylylenediamine, and 70 mol % or more of the constituent unit derived from the dicarboxylic acid is derived from a phenylenediacetic acid; and where X+(Y/3) is 68 or more, when X mol % is defined as a proportion of a constituent unit derived from 1,4-phenylenediacetic acid in the constituent unit derived from the dicarboxylic acid, and Y mol % is defined as a proportion of a constituent unit derived from p-xylylenediamine in the constituent unit derived from the diamine.

Such a configuration enables to obtain a polyamide resin having a high melting point.

The inventors of the present invention studied and found that a polyamide resin obtained from a xylylenediamine and a phenylenediacetic acid has a relatively high melting point. The inventors of the present invention further studied and found that a high proportion of constituent units derived from 1,4-phenylenediacetic acid yields a polyamide resin having a high melting point. Furthermore, a high proportion of constituent units derived from p-xylylenediamine also contributes to the increase of the melting point of the polyamide resin. As a result of diligent research, the inventors of the present invention found that a polyamide resin having a high melting point can be obtained when X+(Y/3) is 68 or more, where X mol % is defined as a proportion of constituent units derived from 1,4-phenylenediacetic acid in the constituent units derived from a dicarboxylic acid, and Y mol % is defined as a proportion of constituents unit derived from p-xylylenediamine in the constituent units derived from a diamine, and completed the present invention.

Furthermore, the polyamide resin of the present invention can achieve a high flexural modulus.

For the polyamide resin according to the present invention, 70 mol % or more of the constituent units derived from a diamine is derived from a xylylenediamine; preferably 80 mol % or more, more preferably 90 mol % or more, even more preferably 95 mol % or more, yet even more preferably 99 mol % or more, and yet even more preferably substantially 100 mol % of the constituent units derived from a diamine is derived from a xylylenediamine. "Substantially" means "not containing anything other than things unavoidably included such as impurities" (hereinafter, same applies to "substantially").

The xylylenediamine is preferably m-xylylenediamine and/or p-xylylenediamine. That is, substantially 100 mol % of the constituent units derived from a diamine is preferably m-xylylenediamine and/or p-xylylenediamine.

As examples of the diamine constituting a constituent unit derived from a diamine that may be included in the polyamide resin according to the present invention, an aliphatic diamine, an alicyclic diamine, and an aromatic diamine are included besides a xylylenediamine. Only one, or two or more of these diamines may be employed.

For an aliphatic diamine, it is preferably an aliphatic diamine having from 6 to 12 carbons, and its examples include straight-chain aliphatic diamines, such as 1,6-hexanediamine, 1,7-heptanediamine, 1,8-octanediamine, 1,9-nonanediamine, 1,10-decanediamine, 1,11-undecanediamine, and 1,12-dodecanediamine; and branched aliphatic diamines, such as 2-methyl-1,8-octanediamine, 4-methyl-1,8-octanediamine, 5-methyl-1,9-nonanediamine, 2,2,4-/2,4,4-trimethylhexamethylenediamine, 2-methyl-1,5-pentanediamine, 2-methyl-1,6-hexanediamine, and 2-methyl-1,7-heptanediamine.

For an alicyclic diamine, exemplified are 1,2-bis(aminomethyl)cyclohexane, 1,3-bis(aminomethyl)cyclohexane, 1,4-bis(aminomethyl)cyclohexane, isophorone diamine, 4,4'-thiobis(cyclohexane-1-amine), and 4,4'-thiobis(cyclohexane-1-amine).

For an aromatic diamine, the descriptions of Paragraph [0052] of WO 2017/126409 are taken into consideration, the contents of which are incorporated herein.

For the polyamide resin according to the present invention, 70 mol % or more of the constituent units derived from the dicarboxylic acid is derived from a phenylenediacetic acid, and preferably 80 mol % or more, more preferably 90 mol % or more, even more preferably 95 mol % or more, yet even more preferably 99 mol % or more, and yet even more preferably substantially 100 mol %, of the constituent units derived from the dicarboxylic acid is derived from a phenylenediacetic acid.

The phenylenediacetic acid is preferably 1,4-phenylenediacetic acid or a mixture of 1,4-phenylenediacetic acid and 1,3-phenylenediacetic acid.

As examples of the dicarboxylic acid constituting a constituent unit derived from a dicarboxylic acid that may be included in the polyamide resin according to the present invention, an aliphatic dicarboxylic acid, an alicyclic dicarboxylic acid, and an aromatic dicarboxylic acid are included besides a phenylenediacetic acid. Only one, or two or more these dicarboxylic acids may be employed.

For the aliphatic dicarboxylic acid exemplified are succinic acid, glutaric acid, adipic acid, pimelic acid, suberic acid, azelaic acid, sebacic acid and dodecane dicarboxylic acid.

For the alicyclic dicarboxylic acid, exemplified are 4,4'-methylene bis(2-methylcyclohexane-1-carboxylic acid), 4,4'-methylene bis(cyclohexane-1-carboxylic acid), decahydro-1,4-naphthalene dicarboxylic acid, 4,4'-oxobis(cyclohexane-1-carboxylic acid), and 4,4'-thiobis(cyclohexane-1-carboxylic acid).

For the aromatic dicarboxylic acid exemplified are isophthalic acid, terephthalic acid, o-phthalic acid, 1,2-naphthalene dicarboxylic acid, 1,3-naphthalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, and 2,7-naphthalene dicarboxylic acid.

For the polyamide resin according to the present invention, X+(Y/3) is 68 or more, preferably 69 or more, more preferably 70 or more, even more preferably 72 or more, yet even more preferably 75 or more, yet even more preferably 82 or more, yet even more preferably 90 or more, and yet even more preferably 95 or more, when X mol % is defined as a proportion of constituent units derived from 1,4-phenylenediacetic acid in the constituent units derived from a dicarboxylic acid, and Y mol % is defined as a proportion of constituents unit derived from p-xylylenediamine in the constituent units derived from a diamine. The upper limit is thus 133, which is when X is 100 mol % and Y is 100 mol %.

X is a proportion of the constituent units derived from 1,4-phenylenediacetic acid taking the total of the constituent units derived from a dicarboxylic acid as 100 mol %, X is preferably 35 mol % or more, more preferably 50 mol % or more, even more preferably more than 50 mol %, yet even more preferably 60 mol % or more, yet even more preferably 65 mol % or more, yet even more preferably 75 mol % or more, yet even more preferably 85 mol % or more, yet even more preferably 90 mol % or more, particularly preferably 95 mol % or more, and particularly more preferably 99 mol % or more. The upper limit of X is 100 mol %.

Y is a proportion of the constituents unit derived from p-xylylenediamine taking the total of the constituent units derived from a diamine as 100 mol %, and Y may be 0 mol %; however, Y is preferably 10 mol % or more, more preferably 15 mol % or more, and even more preferably 20 mol % or more, 25 mol % or more, 35 mol % or more, 40 mol % or more, 50 mol % or more, 55 mol % or more, 70 mol % or more, 75 mol % or more, 80 mol % or more, 90 mol % or more, 95 mol % or more, or 99 mol % or more. The upper limit of Y is 100 mol %, or it may be 80 mol % or less, 60 mol % or less, or 40 mol % or less.

From the perspective of obtaining a polyamide resin having a higher melting point, 70 mol % or more of the constituent units derived from a diamine is derived from p-xylylenediamine, and preferably 80 mol % or more, more preferably 90 mol % or more, even more preferably 95 mol % or more, yet even more preferably 99 mol % or more, and yet even more preferably substantially 100 mol %, of the constituent units derived from a diamine is derived from p-xylylenediamine.

From the perspectives of obtaining a molded article of the polyamide resin having a higher flexural modulus while achieving a high melting point, preferably 60 mol % or more of a xylylenediamine is m-xylylenediamine. Furthermore, the upper limit of the amount of the m-xylylenediamine in the xylylenediamine may be 100%, or it may also be 80 mol % or less. Preferably not more than 40 mol % of the xylylenediamine is p-xylylenediamine. Furthermore, the lower limit of the amount of p-xylylenediamine in the xylylenediamine may be 0%, or it may also be 20 mol % or more. In the present embodiment, a sum of m-xylylenediamine and p-xylylenediamine in the xylylenediamine is preferably 95 mol % or more, and more preferably 99 mol % or more, and it may also be 100 mol %.

The polyamide resin according to the present invention is constituted with a constituent unit derived from a dicarboxylic acid and a constituent unit derived from a diamine, but it may also include other constituent units besides the constituent unit derived from the dicarboxylic acid and the constituent unit derived from the diamine and other moieties such as terminal groups. Examples of other constituent units include, but are not limited to, constituent units derived from lactams, such as s-caprolactam, valerolactam, laurolactam, and undecalactam, and aminocarboxylic acids, such as 11-aminoundecanoic acid and 12-aminododecanoic acid, and the like. Furthermore, the polyamide resin according to the present invention may include minor components such as additives used in the synthesis.

Preferably 70 mass % or more, more preferably 80 mass % or more, even more preferably 90 mass % or more, yet even more preferably 95 mass % or more, and yet even more preferably 98 mass % or more, of the polyamide resin of the present invention is formed from the constituent units derived from dicarboxylic acid and the constituent units derived from diamine.

The first embodiment of the polyamide resin according to the present invention is a polyamide resin, in which 90 mol % or more of the constituent unit derived from a diamine is derived from a xylylenediamine, 90 mol % or more of the constituent unit derived from a dicarboxylic acid is derived from a phenylenediacetic acid, and X+(Y/3) is from 68 to 133, when X mol % is defined as a proportion of a constituent unit derived from 1,4-phenylenediacetic acid in the constituent unit derived from the dicarboxylic acid, and Y mol % is defined as a proportion of a constituent unit derived from p-xylylenediamine in the constituent unit derived from the diamine.

The second embodiment of the polyamide resin according to the present invention is a polyamide resin including a constituent unit derived from a diamine and a constituent unit derived from a dicarboxylic acid, and more than 50 mol % of the constituent unit derived from the dicarboxylic acid is derived from 1,4-phenylenediacetic acid.

The third embodiment of the polyamide resin according to the present invention is a polyamide resin of the first or second embodiment, in which the xylylenediamine includes from 60 to 100 mol % of m-xylylenediamine and from 40 to 0 mol % of p-xylylenediamine. In the polyamide resin, more preferably the xylylenediamine includes from 60 to 80 mol % of m-xylylenediamine and from 40 to 20 mol % of p-xylylenediamine. Such embodiments enable to obtain a molded article of a polyamide resin having a higher flexural modulus.

The polyamide resin according to the first embodiment and the second embodiment preferably further satisfy the preferred ranges of the present invention described above.

The polyamide resin according to the present invention is preferably produced through a melt polycondensation (melt polymerization) method by using a phosphorus atom-containing compound as a catalyst. As the melt polycondensation method, preferable is a method in which a raw material diamine is added dropwise to a molten raw material dicarboxylic acid and heated under pressure to polymerize while condensed water is removed, or a method in which a salt formed from a raw material diamine and a raw material dicarboxylic acid is heated under pressure in the presence of water to polymerize in the molten state while added water and condensed water are removed.

Furthermore, the synthesis can be also performed by a method, in which a salt formed from a raw material diamine and a raw material dicarboxylic acid is heated under pressure in the presence of water to polymerize in the molten state while added water and condensed water are removed so as to obtain a prepolymer, followed by an additional polymerization in an atmosphere with a high temperature and a low pressure.

For the polyamide resin of according to present invention, the melting point is preferably 280° C. or higher, more preferably 283° C. or higher, even more preferably 285° C. or higher, yet even more preferably 290° C. or higher, yet even more preferably 294° C. or higher, yet even more preferably 297° C. or higher, particularly preferably 300° C. or higher, and particularly more preferably 310° C. or higher. The upper limit of the melting point of the polyamide resin is not particularly limited, and it may be, for example, 400° C., or 390° C. or lower.

The melting point is measured in accordance with the method described in examples below.

For the polyamide resin according to the present invention, the glass transition temperature is preferably 100° C. or higher, more preferably 105° C. or higher, even more preferably 110° C. or higher, yet even more preferably 115° C. or higher, yet even more preferably 119° C. or higher, and yet even more preferably 121° C. or higher. The upper limit of the glass transition temperature is not particularly limited, and it may be, for example, 140° C. or lower, or 135° C. or lower.

The glass transition temperature is measured in accordance with the method described in examples below.

For the polyamide resin according to the present invention, a flexural modulus measured in accordance with JIS K 7171 determined by molding into a test piece of 10 mm width×80 mm length×4 mm thickness is preferably 5.0 GPa or more, more preferably 5.5 GPa or more, and even more preferably 5.7 GPa or more. Furthermore, the upper limit of the flexural modulus is not particularly limited, and practically it may be, for example, 7.0 GPa or less, or it may also be 6.0 GPa or less.

The flexural modulus is measured in accordance with the method described in examples below.

Application

The polyamide resin according to the present invention can be used as a composition including the polyamide resin and a molded article formed by molding the composition. The composition may include only one kind or two or more kinds of the polyamide resins according to the present invention or may include other components.

For such other components, polyamide resins besides the polyamide resin according to the present invention; thermoplastic resins besides the polyamide resins; and additives, such as fillers, matting agents, heat resistant stabilizers, weather resistant stabilizers, ultraviolet absorbents, plasticizers, flame retardants, antistatic agents, anti-coloration agents, and anti-gelling agents, can be optionally added as necessary. One kind each, or two or more of these kinds of additives may be used.

Specific examples of such other polyamide resins include polyamide 6, polyamide 66, polyamide 46, polyamide 6/66 (a copolymer including a polyamide 6 component and a polyamide 66 component), polyamide 610, polyamide 612, polyamide 11, polyamide 12, MXD6 [poly(m-xylylene adipamide)], MPXD6 [poly(m-, p-xylylene adipamide)], MXD10 [poly(m-xylylene sebacamide)], MPXD10 [poly (m-, p-xylylene sebacamide)], PXD10 [poly(p-xylylene sebacamide)], MXD6I, 6T/6I, and 9T. One type each of these other polyamide resins, or two or more types thereof may be used.

Examples of thermoplastic resins other than the polyamide resins include polyester resins, such as polyethylene terephthalate, polybutylene terephthalate, polyethylene naphthalate, and polybutylene naphthalate. One type each of these thermoplastic resins other than polyamide resins, or two or more types thereof may be used.

The composition according to the present invention can be molded by a known molding method, such as injection molding, blow molding, extrusion molding, compression molding, stretching, and vacuum molding.

Examples of the molded article formed from the composition of the present invention includes injection molded articles, thin-walled molded articles, hollow molded articles, films (including sheets), extrusion molded articles, fibers, hoses, and tubes.

The field of applications for these molded articles includes transportation equipment components for automobiles and the like, general mechanical parts, precision mechanical parts, electronic and electrical equipment components, OA device parts, building materials and resident related components, medical devices, leisure sporting devices, amusements, medical products, articles for daily use such as food packaging films, containers for paints and oils, and defense and aerospace products. In particular, since the polyamide resin according to the present invention has a high melting point, it is suitable for use in oil and gas applications and automobile and vehicle related component applications.

Examples of the oil and gas applications include seal materials, such as seals, piston rings, valve plates, valve seats, and back-up structures. Furthermore, examples of the automobile and vehicle related component applications include coils for fuel-related solenoid valves, connectors for fuses, horn terminals, electric component insulators, step motor rotors, lamp sockets, lamp reflectors, lamp housings, brake pistons, solenoid bobbins, engine oil filters, ignition cases, and the like.

EXAMPLES

The embodiments of the present invention are described more specifically below through examples. The following descriptions including materials, usage amounts, proportions, processing contents, and processing procedures in the examples below may be changed, as appropriate, as long as there is no deviation from the spirit of the present invention. Therefore, the scope of the present invention is not limited to the specific examples described below.

In the present examples, 1,3-PDAA means 1,3-phenylenediacetic acid, 1,4-PDAA means 1,4-phenylenediacetic acid, MXDA means m-xylylenediamine, and PXDA means p-xylylenediamine.

Example 1

Synthesis of Polyamide Resin

Into a jacketed reaction tube equipped with a condenser, a thermometer and a nitrogen gas-introduction tube, precisely weighed 21.385 g of 1,4-PDAA (0.110 mol), 15.000 g of MXDA (0.110 mol), and 15 g of distilled water were placed, and the reaction tube was fully charged with nitrogen and tightly sealed. It was then heated, and maintained at the internal temperature of 230° C. and the internal pressure of 2.5 MPa for 2 hours. The internal temperature was then increased to 350° C. over approximately 1 hour, while water was distilled off, and the pressure was reduced to atmospheric pressure. After the internal temperature was maintained at 250° C. for 30 minutes, heating was stopped. After cooled to room temperature, the target product was obtained.

Measurement Methods of Glass Transition Temperature (Tg) and Melting Point (Tm)

Differential scanning calorimetry measurements were carried out in accordance with JIS K7121 and K7122 using a differential scanning calorimeter.

For the above polyamide resin, based on a heat-flux differential scanning calorimetry, the temperature was raised to a temperature equal to or higher than an expected melting point from 25° C. at a temperature increase rate of 10° C./min, and the temperature at the maximum of the endothermic peak was determined as a melting point. Next, the melted polyamide resin was rapidly cooled with dry ice, and then the temperature was increased again to the temperature equal to or higher than the melting point at the rate of 10° C./min to determine a glass transition temperature.

In a case where there were two melting points or two glass transition temperatures, a higher temperature was used.

A differential scanning calorimeter "DSC-60", available from Shimadzu Corporation, was used.

Example 2 to Example 10

The same procedure was performed except that the types and the mole ratio of dicarboxylic acids and diamines in Table 1 or Table 2 were used in place of the dicarboxylic acid and the diamine of Example 1. The results are in Table 1 or Table 2.

Reference Example 1 and Reference Example 2

The melting points and the glass transition temperatures were measured in the same manner as described above for MX nylon S6007 (MXD6), available from Mitsubishi Gas Chemical Company, Inc., as reference example 1, and for Amilan CM3001 (PA66), available from Toray Industries, Inc., as reference example 2. The results are indicated in Table 3.

significantly higher than those of MXD6 and the polyamide 66 (Reference Examples 1 and 2)

Examples 2 and 10 (Flexural Modulus)

The resins of Examples 2 and 10 was each molded to measure flexural modulus. Specifically, the resins were pulverized by using a small-sized high speed crusher (WC-3C, available from Osaka Chemical Co., Ltd.). The pulverized resins were processed into a strand shape by using a kneader (Minilab 3, available from HAAKE). The strand-shaped resins were processed into pellets by using a pelletizer (available from Isuzu Kakouki KK). The obtained pellets were molded to form a 10 mm width×80 mm length×4 mm thickness test piece by using an injection molding machine (C. Mobile, available from Shinko Sellbic Co., Ltd.). For the obtained test piece, the flexural modulus was measured. The results are shown in Table 4.

Measurement of Flexural Modulus

For the molded 10 mm width×80 mm length×4 mm thickness test piece, the flexural modulus was measured by using flexural tester in accordance with JIS K 7171.

TABLE 1

|  |  | Example 1 | Example 2 | Example 3 | Example 4 | Example 5 |
|---|---|---|---|---|---|---|
| Dicarboxylic acid | 1,3-PDAA | 0 | 0 | 0 | 0 | 0 |
|  | 1,4-PDAA (component X) | 100 | 100 | 100 | 100 | 100 |
| Diamine | MXDA | 100 | 70 | 40 | 20 | 0 |
|  | PXDA (component Y) | 0 | 30 | 60 | 80 | 100 |
| X + (Y/3) |  | 100 | 110 | 120 | 127 | 133 |
| Tm (° C.) |  | 318 | 326 | 332 | 338 | 375 |
| Tg (° C.) |  | 120 | 123 | 128 | 130 | 133 |

TABLE 2

|  |  | Example 6 | Example 7 | Example 8 | Example 9 | Example 10 |
|---|---|---|---|---|---|---|
| Dicarboxylic acid | 1,3-PDAA | 20 | 30 | 30 | 60 | 30 |
|  | 1,4-PDAA (component X) | 80 | 70 | 70 | 40 | 70 |
| Diamine | MXDA | 100 | 100 | 0 | 0 | 70 |
|  | PXDA (component Y) | 0 | 0 | 100 | 100 | 30 |
| X + (Y/3) |  | 80 | 70 | 103 | 73 | 80 |
| Tm (° C.) |  | 295 | 284 | 312 | 288 | 295 |
| Tg (° C.) |  | 117 | 116 | 130 | 126 | 120 |

TABLE 3

|  | Reference Example 1 | Reference Example 2 |
|---|---|---|
| Polyamide resin | MXD6 | PA66 |
| Dicarboxylic acid | Adipic acid | Adipic acid |
| Diamine | MXDA | Hexamethylene diamine |
| Tm (° C.) | 237 | 268 |
| Tg (° C.) | 85 | 50 |

As Table 1 and Table 2 above indicate, polyamide resins having high melting points were obtained when X+(Y/3) was 68 or more, where X mol % is a proportion of the constituent units derived from 1,4-phenylenediacetic acid, and Y mol % is a proportion of the constituents unit derived from p-xylylenediamine in the constituent units derived from a diamine (Examples 1 to 10). These values were In the present examples, the Bend Graph, available from Toyo Seiki Seisaku-sho, Ltd., was used as a flexural tester.

Reference Example 1 and Reference Example 2 (Flexural Modulus)

The flexural modulus was measured in the same manner as described above for each of reference example 1 (MX nylon S6007 (MXD6), available from Mitsubishi Gas Chemical Company, Inc.) and for reference example 2 (Amilan CM3001 (PA66), available from Toray Industries, Inc.). The results are shown in Table 5.

TABLE 4

|  |  | Example 2 | Example 10 |
|---|---|---|---|
| Dicarboxylic acid | 1,3-PDAA | 0 | 30 |
|  | 1,4-PDAA | 100 | 70 |

TABLE 4-continued

|  |  | Example 2 | Example 10 |
|---|---|---|---|
| Diamine | (component X) | | |
| | MXDA | 70 | 70 |
| | PXDA | 30 | 30 |
| | (component Y) | | |
| X + (Y/3) | | 110 | 80 |
| Flexural modulus (GPa) | | 5.8 | 5.8 |

TABLE 5

|  | Reference Example 1 | Reference Example 2 |
|---|---|---|
| Polyamide resin | MXD6 | PA66 |
| Dicarboxylic acid | Adipic acid | Adipic acid |
| Diamine | MXDA | Hexamethylene diamine |
| Flexural modulus (GPa) | 4.5 | 2.7 |

As Table 4 clearly indicates, when a proportion of the constituent units derived from 1,4-phenylenediacetic acid is defined as X mol % and a proportion of the constituents unit derived from p-xylenediamine in the constituent units derived from diamine is defined as Y mol %, polyamide resins satisfying X+(Y/3) of 68 or more exhibited significantly high flexural moduli as compared to the flexural moduli for MXD6 or polyamide 66 in Table 5.

The invention claimed is:

1. A polyamide resin comprising a constituent unit derived from a diamine and a constituent unit derived from a dicarboxylic acid,
   wherein 90 mol % or more of the constituent unit derived from the diamine is derived from a xylylenediamine, and 90 mol % or more of the constituent unit derived from the dicarboxylic acid is derived from a phenylenediacetic acid; and
   X+(Y/3) is 68 or more, when X mol % is defined as a proportion of a constituent unit derived from 1,4-phenylenediacetic acid in the constituent unit derived from the dicarboxylic acid, and Y mol % is defined as a proportion of a constituent unit derived from p-xylylenediamine in the constituent unit derived from the diamine,
   wherein 60 to 100 mol % of the xylylenediamine is m-xylylenediamine, and 40 to 0 mol % of the xylylenediamine is p-xylylenediamine, and
   wherein the polyamide resin has a melting point of 338° C. or less.

2. The polyamide resin according to claim 1, wherein the phenylenediacetic acid is 1,4-phenylenediacetic acid or a mixture of 1,4-phenylenediacetic acid and 1,3-phenylenediacetic acid.

3. The polyamide resin according to claim 1, wherein X+(Y/3) is 70 or more.

4. A polyamide resin comprising a constituent unit derived from a diamine and a constituent unit derived from a dicarboxylic acid, wherein more than 50 mol % of the constituent unit derived from the dicarboxylic acid is derived from 1,4-phenylenediacetic acid.

5. A polyamide resin comprising a constituent unit derived from a diamine and a constituent unit derived from a dicarboxylic acid,
   wherein 95 mol % or more of the constituent unit derived from the diamine is derived from a xylylenediamine, and 95 mol % or more of the constituent unit derived from the dicarboxylic acid being derived from a phenylenediacetic acid; and
   X+(Y/3) is from 68 to 133, when X mol % is defined as a proportion of a constituent unit derived from 1,4-phenylenediacetic acid in the constituent unit derived from the dicarboxylic acid, and Y mol % is defined as a proportion of a constituent unit derived from p-xylylenediamine in the constituent unit derived from the diamine,
   wherein 60 to 100 mol % of the xylylenediamine is m-xylylenediamine, and 40 to 0 mol % of the xylylenediamine is p-xylylenediamine, and
   wherein the polyamide resin has a melting point of 338° C. or less.

6. The polyamide resin according to claim 1, wherein a melting point of the polyamide resin is 280° C. or higher and 338° C. or less.

7. The polyamide resin according to claim 1, wherein a glass transition temperature of the polyamide resin is 100° C. or higher.

8. A composition comprising the polyamide resin according to claim 1.

9. A molded article comprising the composition according to claim 8.

10. The polyamide resin according to claim 6, wherein X+(Y/3) is 70 or more.

11. The polyamide resin according to claim 4, wherein a melting point of the polyamide resin is 280° C. or higher and 338° C. or less.

12. The polyamide resin according to claim 4, wherein a glass transition temperature of the polyamide resin is 100° C. or higher.

13. A composition comprising the polyamide resin according to claim 4.

14. A molded article comprising the composition according to claim 13.

15. The polyamide resin according to claim 1, wherein a sum of m-xylylenediamine and p-xylylenediamine in the xylylenediamine is 99 mol % or more.

16. The polyamide resin according to claim 1, wherein a sum of m-xylylenediamine and p-xylylenediamine in the xylylenediamine is 99 mol % or more;
   wherein 95 mol % or more of the constituent units derived from a diamine is derived from a xylylenediamine, and 95 mol % or more of the constituent units derived from the dicarboxylic acid is derived from a phenylenediacetic acid; and
   wherein the polyamide resin has a melting point of 280° C. or higher and 338° C. or less.

* * * * *